United States Patent
Oka

(10) Patent No.: US 7,240,241 B2
(45) Date of Patent: Jul. 3, 2007

(54) BACKUP METHOD AND STORAGE CONTROL DEVICE USING THE SAME

(75) Inventor: Nobuyuki Oka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/485,035

(22) Filed: Jul. 11, 2006

(65) Prior Publication Data

US 2006/0253734 A1    Nov. 9, 2006

Related U.S. Application Data

(63) Continuation of application No. 10/356,162, filed on Jan. 31, 2003, now abandoned.

(30) Foreign Application Priority Data

Jul. 10, 2002    (JP)    ............................. 2002-201545

(51) Int. Cl.
*G06F 11/00*    (2006.01)

(52) U.S. Cl. .............................. 714/19; 714/20; 726/24

(58) Field of Classification Search .................... None
See application file for complete search history.

(56) References Cited

U.S. PATENT DOCUMENTS

| | | | |
|---|---|---|---|
| 5,212,784 A * | 5/1993 | Sparks | 714/6 |
| 6,347,375 B1 * | 2/2002 | Reinert et al. | 726/24 |
| 6,477,629 B1 * | 11/2002 | Goshey et al. | 711/162 |
| 6,532,535 B1 * | 3/2003 | Maffezzoni et al. | 713/1 |
| 6,611,850 B1 * | 8/2003 | Shen | 707/204 |
| 6,732,125 B1 * | 5/2004 | Autrey et al. | 707/204 |
| 6,836,830 B1 * | 12/2004 | Yamagami et al. | 711/162 |
| 2002/0095598 A1 * | 7/2002 | Camble et al. | 713/200 |
| 2003/0135704 A1 * | 7/2003 | Martin | 711/162 |
| 2005/0108302 A1 * | 5/2005 | Rand et al. | 707/204 |

OTHER PUBLICATIONS

Marmelstein et al., "A Distributed Architecture for an Adaptive Computer Virus Immune System", 1998, IEEE.*

* cited by examiner

*Primary Examiner*—Gabriel Chu
(74) *Attorney, Agent, or Firm*—Townsend and Townsend and Crew LLP

(57) ABSTRACT

The present invention provides a backup method for a storage control device that instructs a storage device to split a primary volume and a copy volume in the storage device, and to execute a backup operation from the copy volume to a backup volume. The storage device includes the backup volume for the copy volume. The backup method includes: the storage control device allocating a specified number of generations of the backup volume in the storage device for the copy volume; instructing the storage device to split the pair; executing a virus check on the copy volume; copying contents of the copy volume to the backup volume as a most recent generation backup if no virus is detected; updating generations in the backup volume for generations prior to the most recent generation; and instructing the storage device to re-link the split pair.

10 Claims, 8 Drawing Sheets

BACKUP METHOD AND STORAGE CONTROL DEVICE USING THE SAME

BACKGROUND OF THE INVENTION

The present invention relates to a backup method and a storage control device using the same. In recent years, with extended service hours provided by ATMs and the growth of various on-line services such as Internet banking, there has been a demand for corporate information systems to operate 24 hours a day, 365 days a year. As a result, backups and virus checks of data stored in storage devices, e.g., hard disks, are important in these information systems due to the possibility of unexpected system interruptions such as hardware malfunctions or virus infections.

An example of a technology relating to backups and virus checking is described in Japanese laid-open patent publication number Hei 11-134234. Therein, a backup device determines the consistency of the source file for the backup copy by using a means such as virus checking. If the files are found to be consistent, a backup copy is generated from the original file. The technology disclosed in this publication prevents situations where a restored backup copy of an original file cannot be used because the original file was damaged or infected with a virus. As a result, unexpected system interruptions are avoided.

BRIEF SUMMARY OF THE INVENTION

However, in the backup device described above, backups are not performed while a higher-level device such as a host computer accesses a storage device, such as a hard disk, containing the source file. This is because higher-level devices cannot access a storage device while the storage control device is executing a backup routine. This makes it impossible to provide 24-hour/365-day non-stop services of the type described above.

Moreover, since new strains and sub-strains of computer viruses emerge daily, continuously monitoring for computer viruses using up-to-date virus checkers is essential. However, with the backup device described above, virus checking is performed only during a backup operation. The virus checking does not reflect up-to-date virus information, and the data that was backed up may be infected with these new strains or sub-strains of computer viruses.

In recent years, RAID (Redundant Array of Independent Discs) disk devices equipped with MRCF (Multiple RAID Coupling Feature) control functions have been proposed. MRCF is a feature that generates copy volumes that can be used independently without intervention from host software. When using RAID disk devices with MRCF control functions, a storage control device generates a copy volume that is paired with a specific logical volume (primary volume). The primary volume and the copy volume can be used independently so that normal online tasks can be continued with the primary volume while a parallel task, e.g., a backup operation, is carried out on the copy volume.

However, the proposed backup methods that use MRCF control features do not check for viruses during the backup operation. Thus, a virus check must be performed after a backup operation to prevent the backed up data from being rendered useless due to virus infection, as described above. This leads to an increased processing load on the storage control device since both backups and virus checks require I/O operations between the storage control device and the storage device. Although conventional backup methods that use MRCF control features allow files to be restored to their state from the previous backup, they do not allow restoration of files to the state they had at an arbitrary point in time in the past. This created inconvenient operations.

This invention provides a superior backup method that reduces the processing load, as well as a storage control device that uses an embodiment of the method of the invention. The present invention overcomes the problems described above by providing a backup method for a storage control device that instructs the storage device to split a pair of volumes consisting of a primary volume and a copy volume, then executes a backup operation from the copy volume of the split pair to a backup volume. The storage device includes the pair consisting of the primary volume and the copy volume and the backup volume for the copy volume.

A preferred method for performing the backup includes: having the storage control device allocate a specified number of generations of the backup volume in the storage device for the copy volume; instructing the storage device to split the pair of volumes; executing a virus check on the copy volume of the pair; copying the contents of the checked copy volume to the backup volume as a most recent generation backup for the copy volume if no virus is detected by the virus check; updating the generations in the backup volume for generations prior to the most recent generation; and instructing the storage device to re-link the split pair.

Other characteristics of the present invention will be more clear using the figures and the descriptions in this specification.

DETAILED DESCRIPTION OF THE INVENTION

In one embodiment, the present invention provides a backup method for a storage control device that instructs a storage device to split a pair of volumes consisting of a primary volume and a copy volume and to execute a backup operation from the copy volume of the split pair to a backup volume. The storage device includes the pair consisting of the primary volume and the copy volume and the backup volume for the copy volume. The backup method of the storage control device includes: a step in which the storage control device allocates a specified number of generations of the backup volume in the storage device for the copy volume; instructing the storage device to split the volume pair and to execute a virus check on the copy volume of the pair; copying the contents of the checked copy volume to the backup volume as the most recent generation backup of the copy volume if no virus is detected by the virus check; updating the generations in the backup volume for generations subsequent to the most recent generation; and instructing the storage device to re-link the split pair.

In a further embodiment, the present invention provides a backup method wherein the backup method is activated in response to a previously set schedule or an instruction from a user. The invention also provides a backup method wherein a copy volume in which virus checking detection of a virus has been restored because a backup volume is storing a copy volume backup from one generation earlier.

According to another aspect, the present invention provides a backup method wherein: an up-to-date virus check is performed on each of the backup volumes containing backup generations for a copy volume on which a virus was detected by the virus check; a search is made, starting from one generation earlier and working backwards, for a backup volume for the copy volume in which the virus is detected in which a virus was not detected by an up-to-date virus check; and the backup volume retrieved by the search is used to restore the copy volume in which the virus was detected.

The present invention provides a backup method wherein a determination is made, based on previously set conditions or a user instruction, as to whether a predetermined restore operation is to be executed for a copy volume in which the virus check detected a virus; and the pair for the copy volume in which the virus was detected is eliminated if the determination indicates that the predetermined restore operation is not to be executed.

Figure 1:
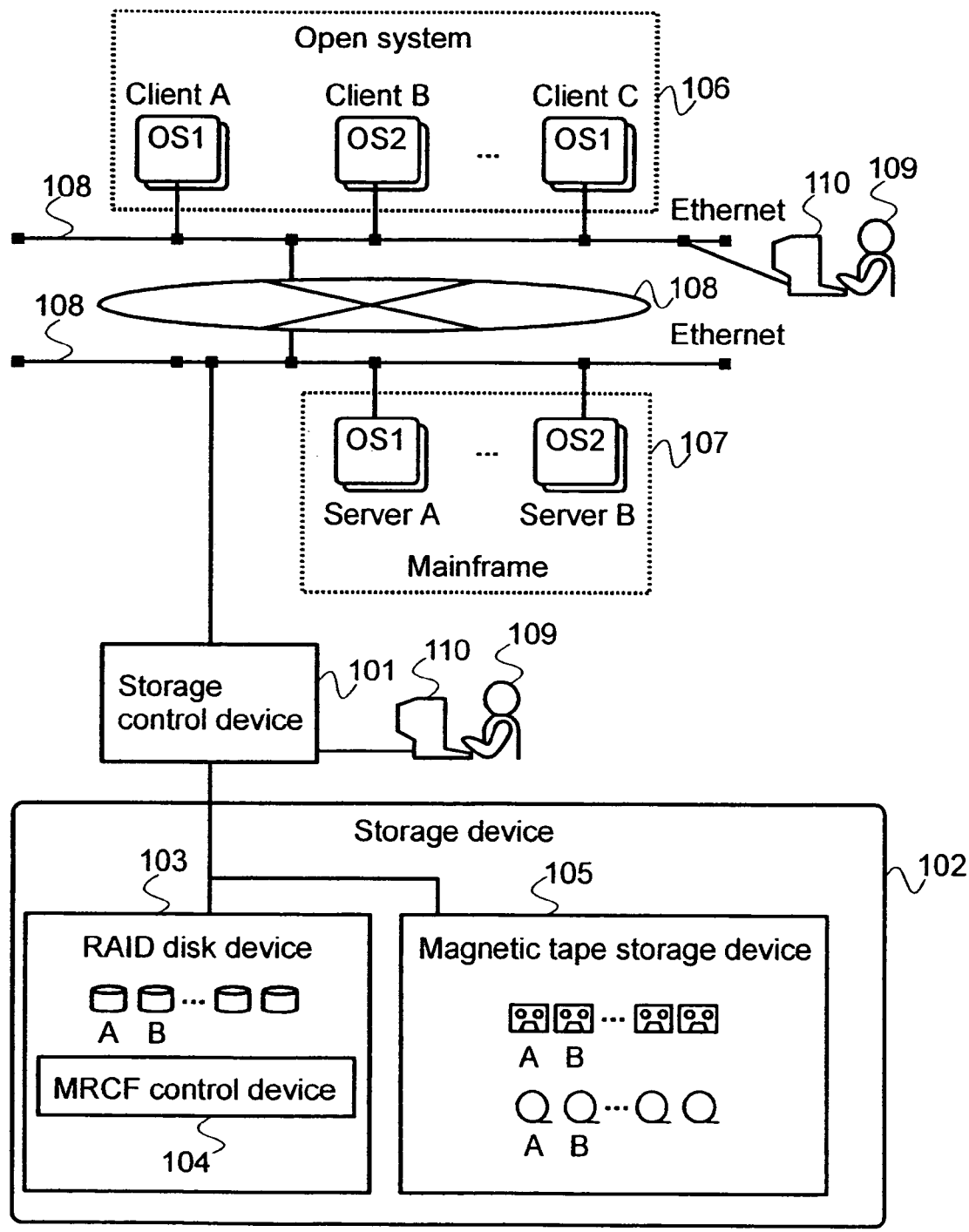
FIG. 1 is a block diagram of the architecture of a storage system including a storage control device.

FIG. 1 is a simplified drawing of the architecture of a storage system including a storage control device according to the present invention. As shown in the figure, this storage system includes: a storage control device 101 characteristic of the present invention; a storage device 102; an open system 106 primarily serving as a client to storage control device 101 and including different types of hardware and operating systems; and a mainframe 107 serving primarily as a server to storage control device 101. Open system 106 and mainframe 107 are connected to storage control device 101 through a communication network 108 as well as through interface devices such as SCSI devices and fiber channels (not shown). An administration terminal 110 of an administrative operator 109, who monitors/administers storage control device 101, is connected to communication network 108 or to storage control device 101 itself.

Storage control device 101 can be, for example, an NAS (Network Attached Storage) server or a disk array controller in a SAN (Storage Area Network) environment, and controls the input and output of data between storage device 102 and external devices. Storage control device 101 includes elements (not shown in the figure) that are standard in conventional hardware for storage control devices 101: a CPU; input/output interfaces for storage device 102 and external devices; main memory; and control circuitry. Storage control device 101 can be part of the same device as storage device 102 or can be a separate device.

Storage device 102 can include a RAID disk device 103, a cartridge-type or open-reel magnetic tape storage device 105, or the like. RAID disk device 103 includes a RAID engine with a MRCF control function 104 as described above. A RAID disk device with no MRCF control function 104 or a disk array device with no RAID engine can also be included. Communication network 108 can be a LAN, WAN, intranet, the Internet, or the like.

Conventional Backup Method Using MRCF Control Function

Figure 2:
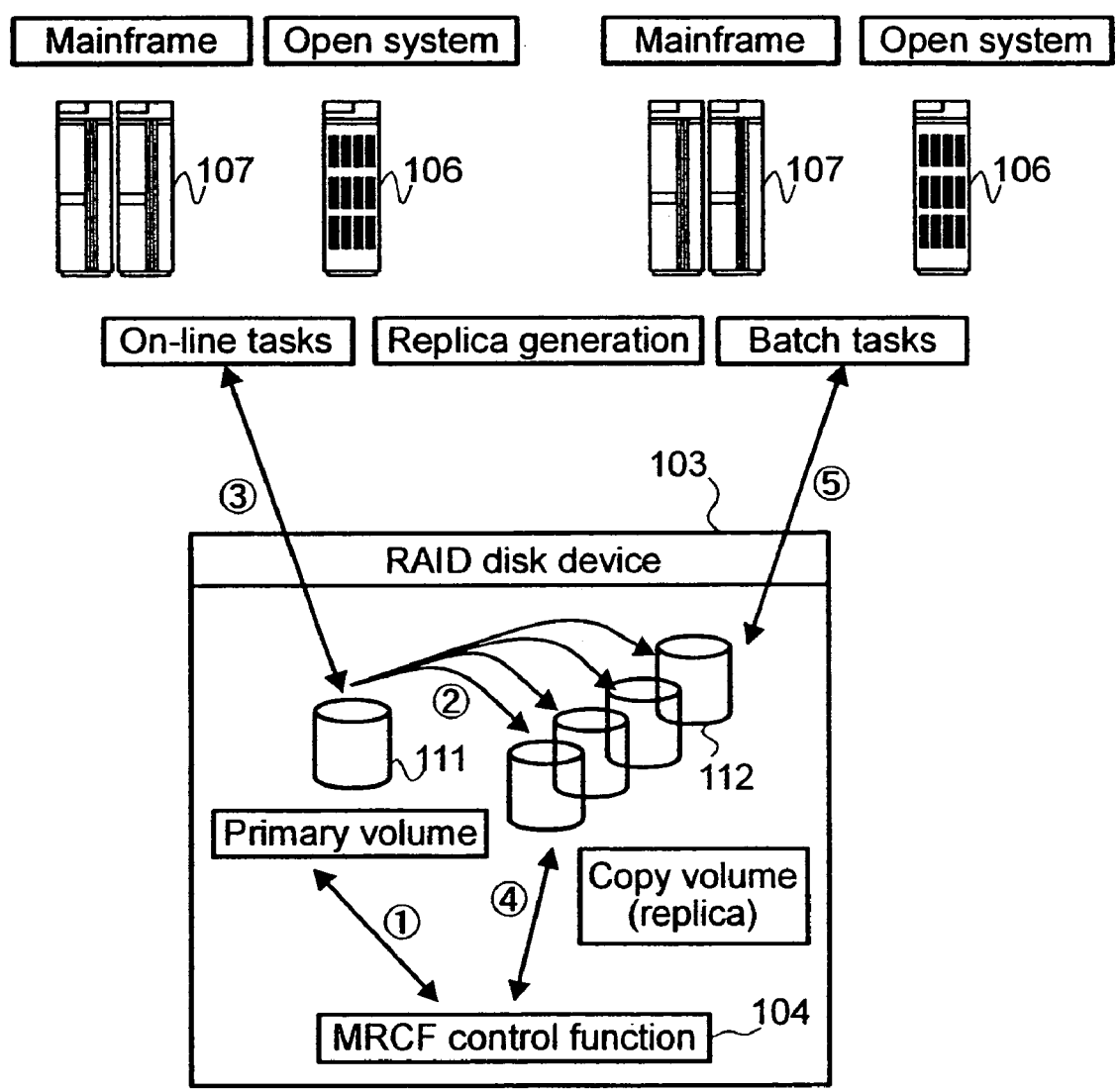
FIG. 2 illustrates a backup operation performed by a RAID disk device with an MRCF control function.

FIG. 2 is a drawing for the purpose of describing a conventional backup process in RAID disk device 103 equipped with MRCF control function 104. In the following description, a storage system includes: RAID disk device 103, with MRCF control function 104; an open system 106 or a mainframe 107 providing processing for online tasks (hereinafter referred to as the online task device); and an open system 106 or a mainframe 107 providing processing for batch tasks such as backups (hereinafter referred to as the batch task device). The online task device and the batch task device operate in parallel.

First, a summary of MRCF control function 104 is explained. MRCF control function 104 generates a copy volume 112 of a primary volume 111 for online tasks in RAID disk device 103. Copy volume 112 is generated in RAID disk device 103 without going through server software and can be used independently. If primary volume 111 and copy volume 112, which form a pair, are kept in a state that allows them to be used independently (split state), the contents of the primary volume and the copy volume can become different. Therefore, when batch tasks for copy volume 112 are completed, a differential copy is performed between the volumes and primary volume 111 and copy volume 112, which form a pair, are put in a linked state (duplex state) (this operation is referred to as a pair linking operation). In the duplex state, an I/O operation from the online task device to primary volume 111 leads to the same I/O operation being performed on copy volume 112 in the RAID disk device 103. To move from the duplex state to the split state, differential copying is performed on copy volume 112 based on the updated contents of primary volume 111, and the primary volume and the copy volume, which form a pair, are split (this operation is referred to as a pair splitting operation).

Next, a backup operation that uses MRCF control function 104 in a RAID disk device 103 equipped with the MRCF control function is described. First, a device (not shown in the figure) controlling RAID disk device 103 sends a request to MRCF control function 104, and a batch task copy volume 112 is newly allocated to form a pair with online task primary volume 111 ((1) in the figure). Copy volume 112 contains copies of the contents of the primary volume 111 ((2) in the figure). The online task device begins accessing the primary volume 111 and continuously performs online tasks ((3) in the figure).

At this point, when the batch task device sends a request to make a backup of copy volume 112, RAID disk device 103 performs pair splitting through MRCF control function 104 so that a split state is enabled ((4) in the figure). Then, in this split state, a backup of the copy volume is started ((5) in the figure). After the backup operation is completed, RAID disk device 103 uses MRCF control function 104 to perform pair linking, enabling the duplex state. After this pair-linking operation, an operation is performed to make the contents of the primary volume 111 and the copy volume 112 consistent.

Software Architecture

Figure 3:
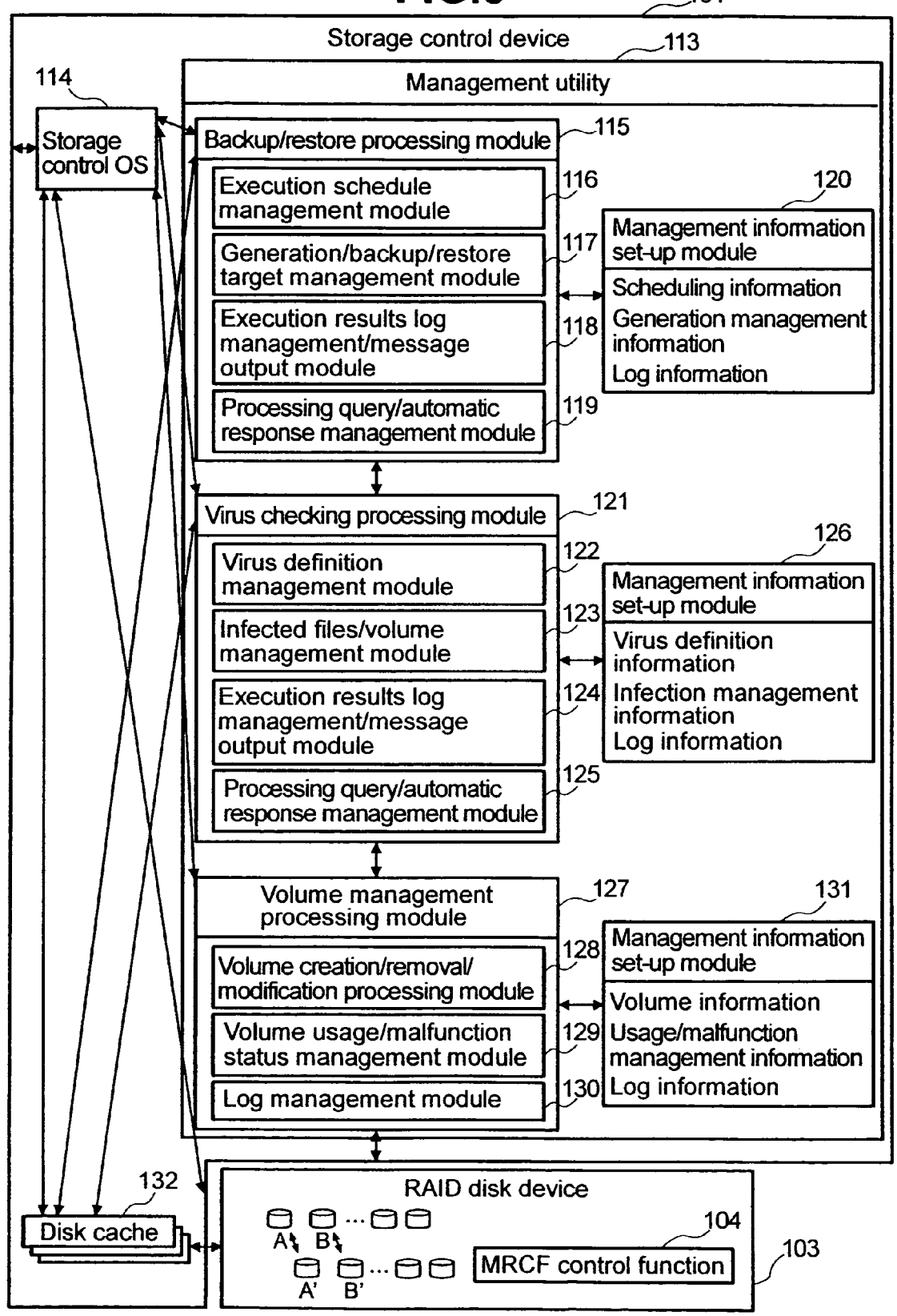
FIG. 3 illustrates the software architecture of a storage control device.

FIG. 3 shows a simplified drawing of the software architecture in storage control device 101 of the present invention. The software of storage control device 101 consists essentially of a management utility 113 and a storage control operating system 114 for managing hardware and software resources of storage control device 101, including management utility 113.

This figure shows one or a plurality of disk caches 132 used as temporary data storage regions when the data from the backup source volume is being copied to the backup destination volume. The disk cache 132 can be set up in the address space of the main memory of control device 101 or in separate memory. Alternatively, a workspace disk or magnetic tape storage device 105 of the storage device 103 can be used.

The management utility 113 essentially consists of a backup/restore processing module 115; a virus checking processing module 121; a volume management processing module 127; and management set-up modules 120, 126, 131 storing management information for processing modules 115, 121, and 127. Management information for processing modules 115, 121, 127 can also be stored in a single management information set-up module.

Next, the features of processing modules 115, 121, 127 of management utility 113 are described. Backup/restore processing module 115 includes an execution schedule management module 116, a generation/backup/restore target management module 117, an execution results log management/message output module 118, and a processing query/automatic response management module 119.

Execution schedule management module 116 manages scheduling information such as dates and times for backup operations and volumes/filenames to be backed up. Backup operations are started based on this scheduling information. The scheduling information can be retrieved from open system 106, mainframe 107, administration terminal 109 (hereinafter these will be collectively referred to as external devices), or the like. The retrieved scheduling information is stored in management information settings module 120. Other than starting backups based on scheduling information as described above, backup operations can be started by execution schedule management module 116 when a request is received to start a backup operation from an external device.

Generation/backup/restore target management module 117 manages generational information for backup volumes and generation management information, including backup source/destination volume information. This generation management information is stored in management information set-up module 120. In addition, settings are made regarding whether or not to restore volumes or files that have remained unchanged through specific generations.

The execution results log management/message output module 118 generates execution results logs containing information such as dates and times at which backup/restore operations took place. This results log is stored in management information set-up module 120. Execution results log management/message output module 118 also outputs messages indicating the status of backup/restore operations.

If an error takes place during a backup/restore operation, processing query/automatic response management module 119 outputs a message describing the error to an external device and issues a query about how to handle the error. Alternatively, methods and information regarding how to handle expected errors can be stored ahead of time, and when an error occurs the processing query/automatic response management module 119 can lookup the corresponding information and automatically respond to the error.

Next, the virus checking processing module 121 is described. Virus checking processing module 121 includes a virus definition management module, an infected files/volume management module 123, an execution results log management/message output module 124, and a processing query/automatic response management module 125.

Virus definition management module 122 manages virus definition information, including virus definition files used during virus checking and version information thereof, the date of the most recent update, and the like. The virus definition information is retrieved from an external device and stored in management information set-up module 126.

Virus definition management module 122 keeps track of whether the virus definition files are the most recent ones and updates virus definition files. This type of updating is performed based on scheduling information for virus definition files (herein virus definition update scheduling information) stored in management information set-up module 126. When virus definition files are updated to the most recent versions, virus definition management module 122 performs virus checks on existing backup volumes based on the virus definition update scheduling information regardless of whether there is scheduling information for backups. Virus definition update scheduling information can be included in backup scheduling information stored in management information set-up module 120.

If a virus is detected as a result of a virus check based on virus definition update scheduling information, information looked up or updated from the generation/backup/restore target management module 117 is used to perform a restore while the system is in a degraded operating state in which an attribute indicating unavailability is applied to primary volume 111 and copy volume 112. Alternatively, the system can be stopped.

Infected files/volume management module 123 manages infection management information, including presence of files and volumes infected by a virus, the type of infecting virus, the date and time at which virus infection was confirmed, and the like. This infection management information can be retrieved by extracting the corresponding information from the execution results logs generated during virus checks. Retrieved infection management information is stored in the management information set-up module 126.

Execution results log management/output module 124 and processing query/automatic response management module 125 perform operations analogous to execution results log management/output module 118 and processing query/automatic response management module 119 of backup/restore processing module 115, with the target for these operations being virus checking operations.

Next, volume management processing module 127 is described. Volume management processing module 127 includes: a volume creation/removal/modification processing module 128, a volume usage/malfunction status management module 129, and a log management module 130.

When a backup volume on which generation management is being performed needs to be copied or modified, volume creation/removal/modification processing module 128 uses volume usage status information and the like stored in management information set-up module 131 to create/remove/modify a volume in the backup volumes. The log information generated when volume creation/removal/modification processing module 128 performs various operations is managed by log management module 130. The volume usage/malfunction status management module 129 manages current usage status information for backup source/destination volumes and past malfunction status information.

Backup Method

Figure 5:
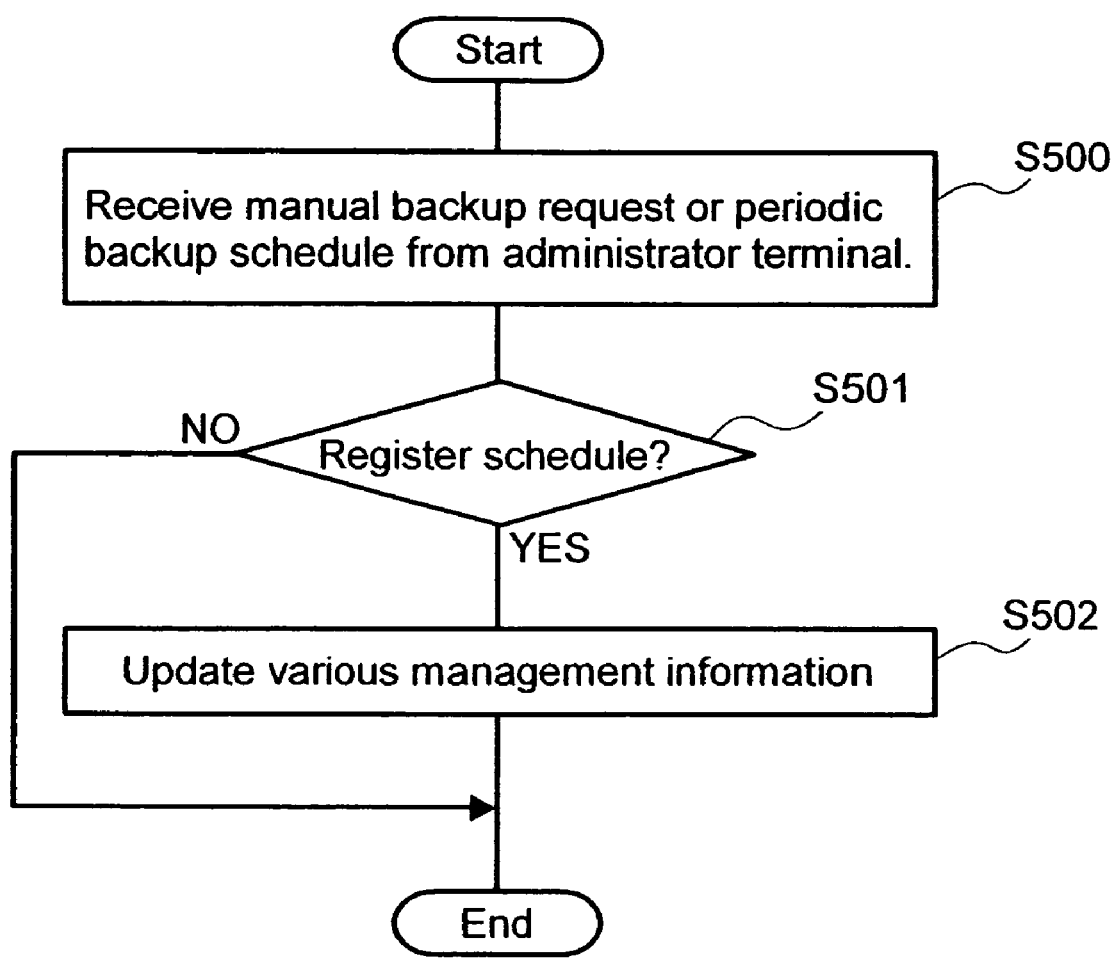
FIG. 5 is a flowchart illustrating a process in a backup method.
Figure 6:
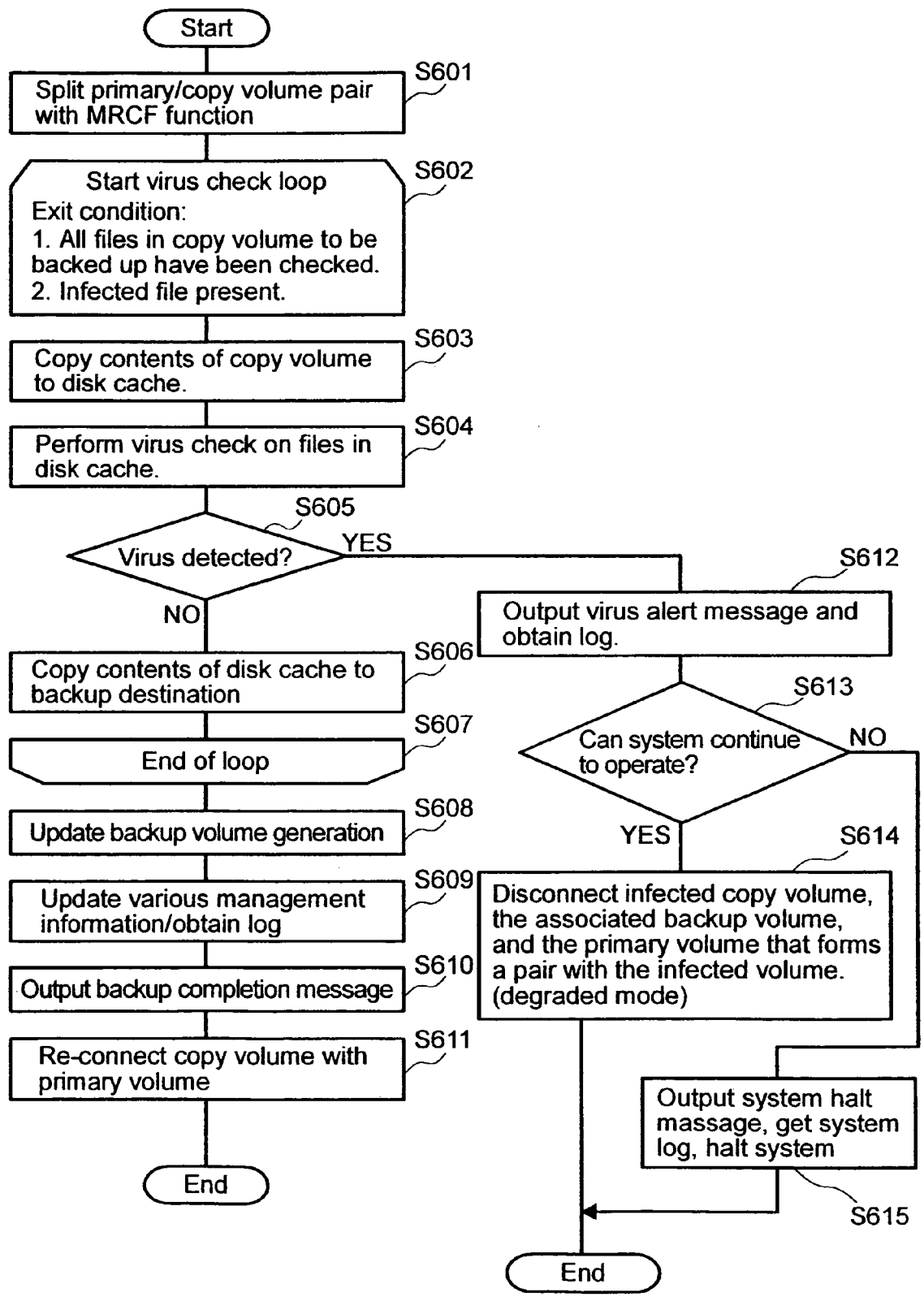
FIG. 6 is a flowchart illustrating another process in a backup method.

A backup method using storage control device 101 according to the present invention is now described using the flowcharts in FIG. 5 and FIG. 6, which illustrate the operations of storage control device 101. First, FIG. 5 shows a flowchart illustrating backup/schedule management operations performed by storage control device 101 according to the present invention. As shown in the figure, storage control device 101 receives a backup request, including the volume/filename to be backed up, the time at which to begin the backup, and the like, from an external device acting as a backup request source (S500). Execution schedule management module 116 stores scheduling information associated with the received content in management information set-up module 120 (S501). Generation/backup/restore target management module 117 and infected file/volume management module 123 are used to update various management information other than scheduling information (generation management information, infection management information, and the like) (S502).

In this manner, storage control device 101 can be used to execute backups manually based on requests from external devices as well as to perform automatic backups based on scheduling information set up ahead of time. This improves the ease of performing backup operations for the user of storage control device 101.

Next, FIG. 6 shows a flowchart illustrating the backup operations performed by storage control device 101 according to the present invention. First, storage control device 101 uses MRCF control function 104 of RAID disk device 103 to generate a pair from primary volume 111 and copy volume 112 in a state that can be used independently (split state). The contents of primary volume 111 are copied to copy volume 112. Differential copies between the primary volume 111 and the copy volume 112 are made periodically while duplex operation is enabled.

When a backup operation is to be started based on a request from an external device or scheduling information set up ahead of time, storage control device 101 uses MRCF control function 104 of RAID disk device 103 to split the copy volume and the primary volume pair to be backed up, enabling the split state (S601). Then, in this split state, the backup of the copy volume is begun (S602). At this point, the contents of disk cache 132 used as temporary backup data storage can be cleared, but in the description below the contents of the disk cache are overwritten.

Storage control device 101 uses backup/restore processing module 115 to copy the files stored in copy volume 112 to be backed up to disk cache 132 (S603). Then, virus checking processing module 121 performs a virus check on the files copied to disk cache 132 according to a predetermined file sequence (S604). If no virus is detected, the checked files stored in disk cache 132 are copied to backup volume 133 serving as the storage destination for the most recent generation (n+1-th generation) content of copy volume 111 (S605-S606). These operations are performed on all the files copied to disk cache 132 (S607).

When periodic backups are performed over time, the storage region for backup volume 133 will grow daily compared to the volume used for tasks. This can lead to reduced availability of space used by the storage system as a whole to store data, resulting in the inability to create new volumes to be used for tasks. Therefore, an upper limit can be set on the generation of backup volumes 133, and backup/restore operations can be performed for the specified number of generations of backup volumes.

Due to factors such as the storage capacity of disk cache 132 being exceeded, it may not be possible for all the files stored in copy volume 112 to be copied all at once to disk cache 132. In such cases, the files can be split up and copied to one or more disk caches 132. Alternatively, steps S602-S607 can be repeated until all the files in copy volume 112 have been copied to disk cache 132.

Next, storage control device 101 uses generation/backup/restore target management module 117 to update backup volume 133 so that the contents of copy volume 112 from the oldest generation (first generation) to the most recent generation (nth generation) are updated to indicate one prior generation (S608). Processing modules 115, 121, 127 update management information (generation management information, infection management information, volume information, and the like) and generate log information (S609). A message indicating that the backup operation has been completed is output to an external device (S610). MRCF control function 104 of RAID disk device 103 then re-links the split primary volume and the copy volume pair to enable duplex status.

In this manner, storage control device 101 can use the MRCF control function of the RAID disk device to make backups and perform virus checks on a copy volume in a split state. Since the backup operation and the virus check is performed over a single machine cycle (I/O operation) between storage control device 101 and RAID disk device 103, the processing load on storage control device 101 can be reduced. Further, since virus checking will always take place during backups, the inability to use restored backup data due to virus infection can be avoided.

If, during the virus checking performed on the files copied to disk cache 132, a virus is detected in a file (S605), storage control device 101 halts the backup operation and processing modules 115, 121, 127 generate log information. A warning message is output to the external device to indicate that a virus has been detected. Then, if, based on a pre-set algorithm or an instruction from a user of the external device, the storage system is to continue operating (S613), an unavailability attribute is applied to the copy volume 112 on which the virus was detected as well as to the paired primary volume 111, and these volumes are separated from the storage system. The storage system then continues operating in degraded mode using the other volumes 111, 112 (S614).

If the storage system is not to continue operating, storage control device 101 generates a system log or outputs a message to the external device indicating that the system is being halted, and the system is stopped (S615). In this manner, when a virus is detected, storage control device 101 can simply stop the system or the system can continue operating in degraded mode to allow safe, continued operation.

Restore Method

Figure 7:
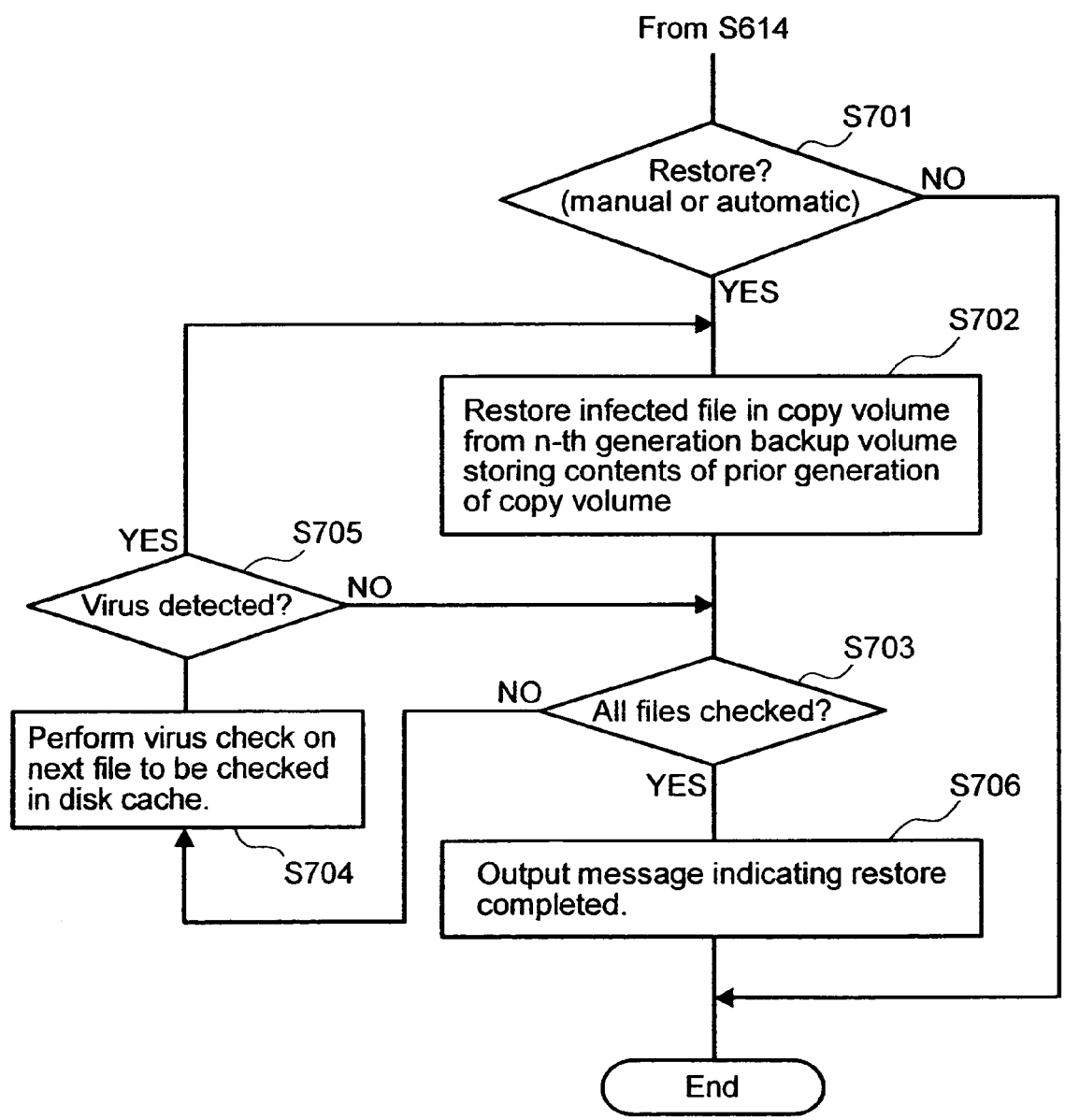
FIG. 7 is a flowchart illustrating a further process in a backup method.

If the storage system is to continue operations in degraded mode (S614), anti-virus operations, e.g., file restoration, are performed on primary volume 111 and copy volume 112 disconnected from the storage system. FIG. 7 is a flowchart illustrating restore operations performed by storage control device 101 according to the present invention. In the description below, an infected file in copy volume 112 is restored based on the corresponding file in the backup volume holding the contents of the previous generation (nth generation).

First, based on a preset algorithm or an instruction from a user at an external device who saw the virus detection message, storage control device 101 determines whether or not to restore the infected file (S701). If the infected file is to be restored, the infected file in copy volume 112 where the infected file was detected is restored based on the corresponding file from the nth generation backup volume 133 in which the content from the previous generation is stored (S702).

Virus checking is performed sequentially on all the unchecked files in copy volume 112 where the infected file was detected (S703-S704). If another infected file is detected during this virus check (S705), the infected file is restored using the corresponding file in the nth generation backup volume described above. These operations are repeated until all the files have been checked in copy volume 112 where the infected file was detected. When this is completed, a message is output to the indicated external device that the restore operation has been completed (S706). After completion of the restore operation, the unavailability attribute is removed from primary volume 111 and copy volume 112, which have been disconnected from the storage system, and the storage system can be restored to the status it had before a virus was detected.

In this manner, storage control device 101 can guarantee that files stored in the backup volumes 133, on which generational management is performed, have been checked for viruses. Thus, infected files in copy volume 112 can be restored using a simple method involving the corresponding file in backup volume 133 associated with the earliest generation (nth generation).

Figure 8:
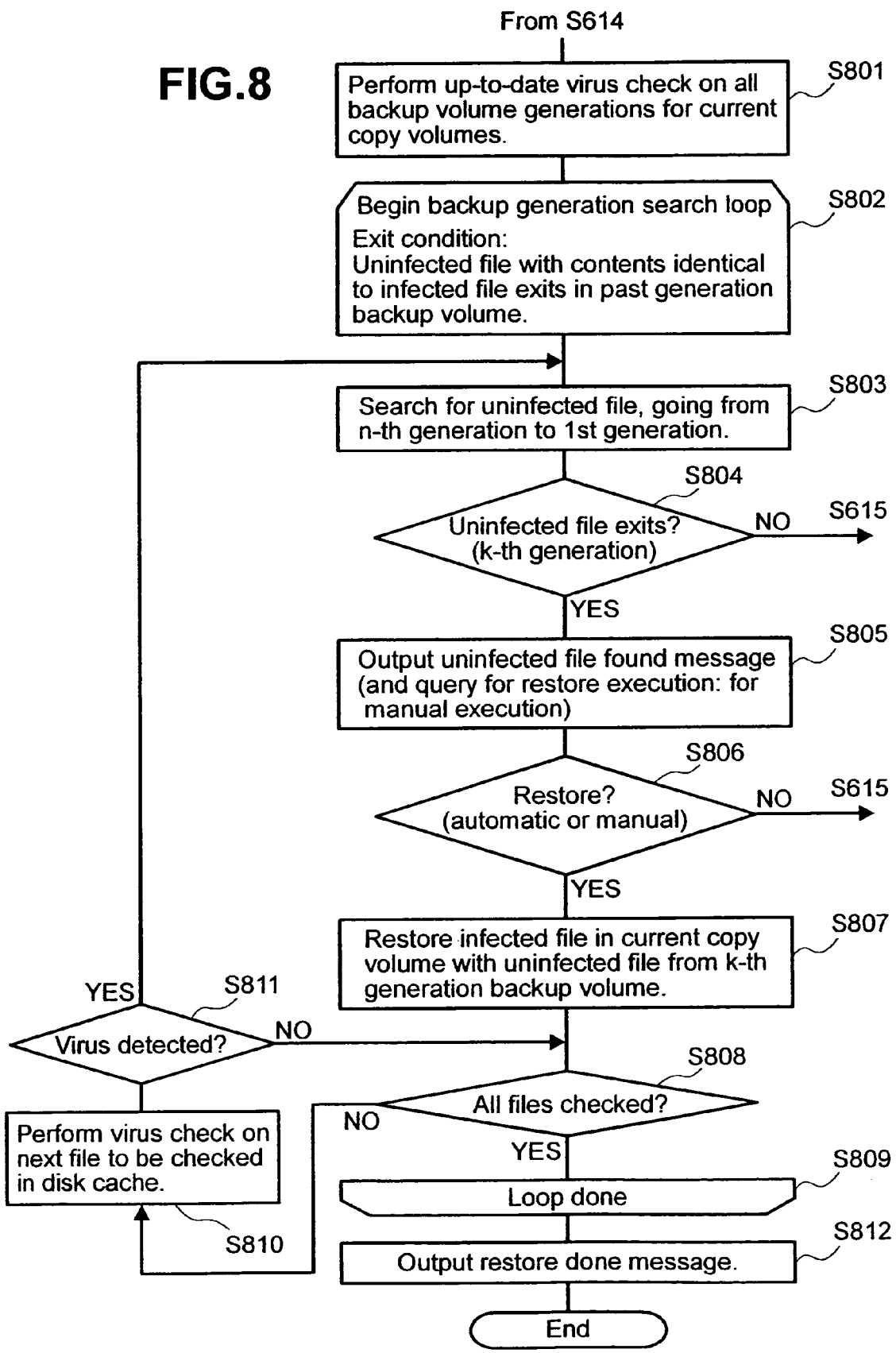
FIG. 8 is a flowchart illustrating a still further process in a backup method.

In this restoring process, it is possible that a virus checking operation that was performed in conjunction with a past backup did not reflect the latest virus definition information. Thus, a restore operation performed by storage control device 101 according to the present invention that reflects the latest virus definition information is described using FIG. 4, which illustrates the correspondence between copy volume 112, based on primary volume 111 and backup volume 133, as well as the flowchart shown in FIG. 8.

Figure 4:
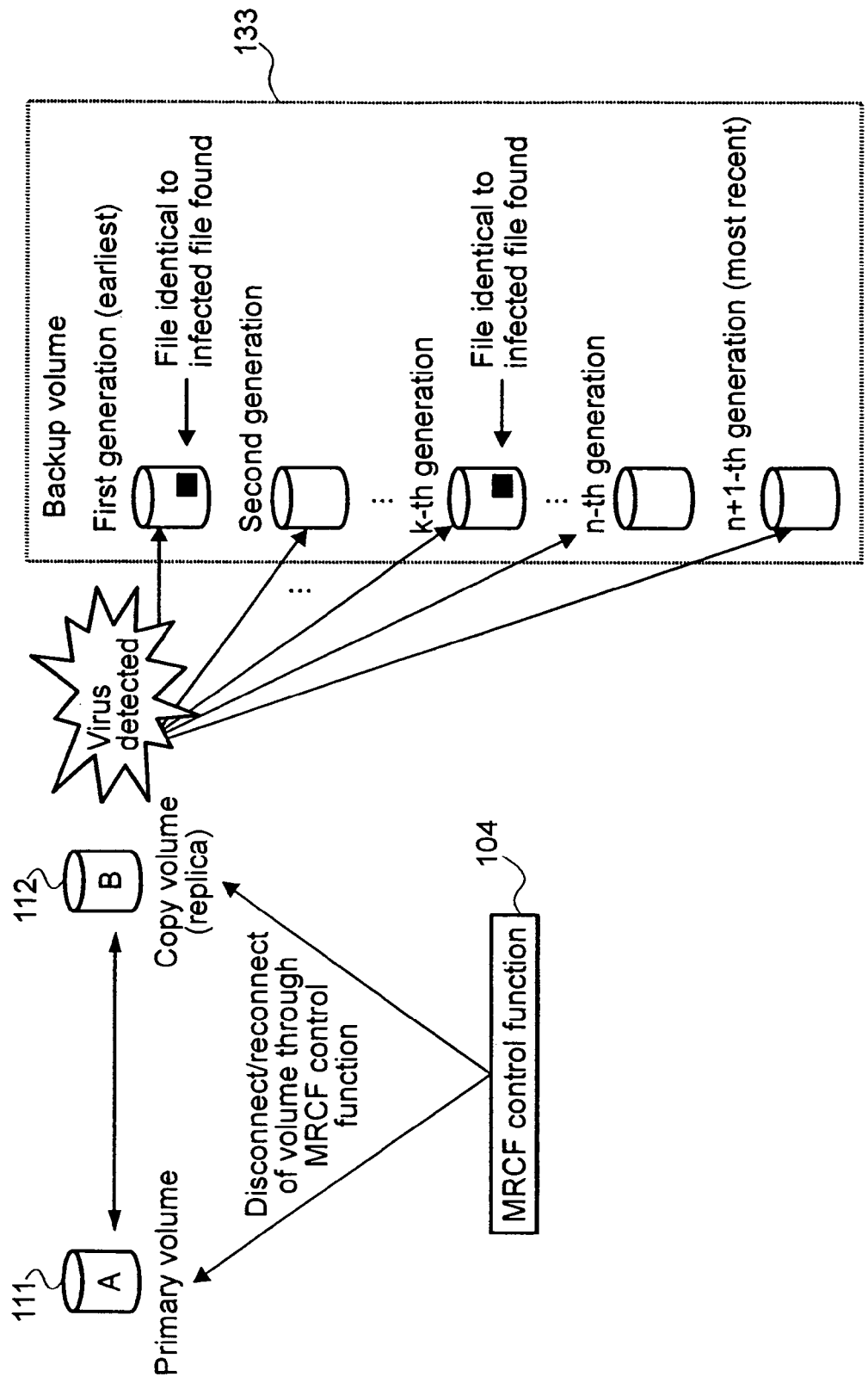
FIG. 4 illustrates the management of volume generation in a storage control device.

As shown in FIG. 4, MRCF control function 104 of RAID disk device 103 generates a pair consisting of primary volume 111 and copy volume 112. While this pair is in a split state, a backup to copy volume 112 is made at the same time the primary volume 111 is performing online processing. Generational management is performed on backup volumes 133 holding the contents of the first generation backup to the nth generation backup of the copy volume. The backup volume for the first generation is backup volume 133 containing the earliest generation of copy volume 112, and the nth generation backup volume 133 contains the most recent generation of copy volume 112. The n+1-th generation backup volume 133 is the storage destination for the newest generation backup in the next backup operation. During this backup operation, an infected file is detected in copy volume 112. This copy volume and the paired primary volume are disconnected from the storage system, and the storage system continues to operate in a degraded state (S614).

Next, storage control device 101 uses the most recent virus definition information in the virus-checking operation described above (S604) and performs an up-to-date virus check on the files stored in backup volumes 133 for all the generations. Then, going in sequence from the nth generation to the first generation, a search is made for an uninfected file with the contents of the infected file before infection (S802). If such a file (kth generation) is found (S804), a message indicating that an uninfected file has been found is output to the external device and the user is queried as to whether a restore operation is to be executed (S805). Then, if the query result indicates that a restore operation is to be performed, the retrieved file (kth generation) is used to restore the infected file in copy volume 112 (S806-S807). If a large number of infected files is found, the chances are high that the entire volume on which these files are stored is infected, so restoration can be performed by volume rather than file.

If the operation described above is not able to find an uninfected file or if a restore operation is not to be performed, system logs are generated and a message is output to the external device indicating that the system is being halted. The storage system is then stopped (S615). The execution of the restore operation can be done by querying the user of the external device and performing the restore operation based on instructions from the user, but it would also be possible to have the restore operation performed automatically by the storage control device 101 based on a preset algorithm.

Next, virus checking is performed sequentially on all the files that have not been checked in copy volume 112 in which the infected file was detected (S808-S809). If another infected file is detected during this virus checking (S811), a search is made as described above, going from the nth generation to the first generation, for an uninfected file that would have the contents of the infected file before infection. The infected file is then restored using the retrieved uninfected file. The restore operation in this case can, for the reason described above, be performed on the volume level as well.

The operations described above are repeated until virus checking has been performed on all the files in copy volume 112 in which an infected file was detected. Once this operation is completed, a message indicating that the restore operation has been completed is output to the external device (S812). After the restore operation is completed, the unavailability attribute for primary volume 111 and copy volume 112, which have been disconnected from the storage system, is removed and the storage system can be restored to the operation status it had before a virus was detected.

If, as shown in FIG. 4, the uninfected file described above spans across multiple generations from the k-th generation backup volume 133 to the first generation backup volume 133, it would be possible in the restore execution query to the user of the external device (S805) to ask which uninfected file from which generation should be restored. Alternatively, the uninfected file from the most recent generation can be restored automatically.

Since the copy volume that has been restored as described above is now in an uninfected state, a backup operation is performed on the restored contents as the most recent generation backup (n+1-th generation). In this manner, when storage control device 101 uses the generational backup volumes 133 for restore operations, up-to-date virus checking based on the most recent virus definition information is performed on the files stored in backup volumes 133 for each generation. This prevents damage from infected files in case an infected file that was not detected in a virus check from a prior backup operation is stored in a backup volume. With the backup method of the present invention, the processing load on the storage control device can be reduced and the operation of the device can be improved.

What is claimed is:

1. In a backup method for a storage control device that instructs a storage device to split a pair of volumes consisting of a primary volume and a copy volume thereof in the storage device and executes a backup operation from the copy volume of the split pair to a backup volume, the storage device including the pair consisting of the primary volume and the copy volume thereof and the backup volume for the copy volume, a backup method for a storage control device comprising:

causing the storage control device to allocate a specified number of generations in the backup volume in the storage device for the copy volume;

instructing the storage device to split the pair;

executing a virus check on the copy volume of the pair;

copying contents of the virus checked copy volume to the backup volume as a most recent generation backup for the copy volume if no virus is detected by the virus check;

updating the generations in the backup volume for generations prior to the most recent generation; and instructing the storage device to re-link the split pair;

performing an up-to-date virus check on each of the backup generations contained in the backup volume for a copy volume on which a virus was detected by the virus check;

making a search, starting from one generation prior and working backwards, for a backup generation in which a virus is not detected by the up-to-date virus check for the copy volume in which the virus is detected; and using a backup generation retrieved by the search to restore the copy volume in which the virus was detected;

determining whether the storage device is to continue operating if a virus is detected in the virus check; and disconnecting the copy volume in which the virus is detected and the paired primary volume from the storage device if the storage device is to continue operating.

2. A backup method as in claim 1 wherein a process according to the backup method is activated in response to at least one of a schedule or an instruction from a user.

3. A backup method as in claim 1 wherein a copy volume in which the virus checking detected a virus is restored based on a backup volume storing a copy volume backup from one generation prior.

4. A backup method as in claim 1 wherein:

a determination is made, based on at least one of desired conditions or a user instruction, as to whether a predetermined restore operation is to be executed for a copy volume in which the virus check detected a virus; and the pair for the copy volume in which the virus was detected is eliminated if the determination indicates that the predetermined restore operation is not to be executed.

5. In a storage control device that instructs a storage device to split a pair of volumes consisting of a primary volume and a copy volume thereof in the storage device and executes a backup operation from the copy volume of the split pair to a backup volume, the storage device including the pair consisting of the primary volume and the copy volume thereof and the backup volume for the copy volume, a storage control device comprising:

means for allocating a specified number of generations in the backup volumes in the storage device for the copy volume;

means for instructing the storage device to split the pair and executing a virus check on the copy volume of the pair;

means for copying contents of the checked copy volume to the backup volume as a most recent generation backup for the copy volume if no virus is detected by the virus check;

means for updating the generations in the backup volume for generations prior to the most recent generation;

means for instructing the storage device to re-link the split pair;

means for performing an up-to-date virus check on each of the backup generations contained in the backup volume for a copy volume on which a virus was detected by the virus check;

means for making a search, starting from one generation prior and working backwards, for a backup generation in which a virus is not detected by the up-to-date virus check for the copy volume in which the virus is detected; and means for using a backup generation retrieved by the search to restore the copy volume in which the virus was detected;

means for determining whether the storage device is to continue operating if a virus is detected in the virus check; and means for disconnecting the copy volume in which the virus is detected and the paired primary volume from the storage device if the storage device is to continue operating.

6. A storage control device as in claim 5, further comprising:

means for making a determination, based on at least one of desired conditions or a user instruction, as to whether a predetermined restore operation is to be executed for a copy volume in which the virus check detected a virus; and means for eliminating the pair for the copy volume in which the virus was detected if the determination indicates that the predetermined restore operation is not to be executed.

7. A storage control device as in claim 5, further comprising:

means for restoring a copy volume in which the virus checking detected a virus, based on a backup volume storing a copy volume backup from one generation prior.

8. A storage control device for instructing a storage device to split a pair of volumes consisting of a primary volume and a copy volume thereof in the storage device and executes a backup operation from the copy volume of the split pair to a backup volume, the storage device including the pair consisting of the primary volume and the copy volume thereof and the backup volume for the copy volume, the storage control device comprising:

a module configured to allocate a specified number of generations in the backup volumes in the storage device for the copy volume;

a module configured to instruct the storage device to split the pair and execute a virus check on the copy volume of the pair;

a module configured to copy contents of the checked copy volume to the backup volume as a most recent generation backup for the copy volume if no virus is detected by the virus check;

a module configured to update the generations in the backup volume for generations prior to the most recent generation;

a module configured to instruct the storage device to re-link the split pair;

a module configured to perform an up-to-date virus check on each of the backup generations contained in the backup volume for a copy volume on which a virus was detected by the virus check;

a module configured to make a search, starting from one generation prior and working backwards, for a backup generation in which a virus is not detected by the up-to-date Virus check for the copy volume in which the virus is detected; and a module configured to use a backup generation retrieved by the search to restore the copy volume in which the virus was detected;

a module configured to determine whether the storage device is to continue operating if a virus is detected in the virus check; and a module configured to disconnect the copy volume in which the virus is detected and the paired primary volume from the storage device if the storage device is to continue operating.

9. A storage control device as in claim 8, further comprising:

a module configured to make a determination, based on at least one of desired conditions or a user instruction, as to whether a predetermined restore operation is to be executed for a copy volume in which the virus check detected a virus; and a module configured to eliminate the pair for the copy volume in which the virus was detected if the determination indicates that the predetermined restore operation is not to be executed.

10. A storage control device as in claim 8, further comprising:

a module configured to restore a copy volume in which the virus checking detected a virus, based on a backup volume storing a copy volume backup from one generation prior.

* * * * *